(12) United States Patent
Terasawa

(10) Patent No.: US 7,685,449 B2
(45) Date of Patent: Mar. 23, 2010

(54) COMMUNICATION DEVICE, SEMICONDUCTOR INTEGRATED CIRCUIT DEVICE, AND COMMUNICATION SYSTEM

(75) Inventor: Naoya Terasawa, Chitose (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 615 days.

(21) Appl. No.: 11/715,700

(22) Filed: Mar. 8, 2007

(65) Prior Publication Data

US 2008/0018486 A1    Jan. 24, 2008

(30) Foreign Application Priority Data

Mar. 13, 2006  (JP)  ............... 2006-068100
Jan. 22, 2007  (JP)  ............... 2007-011480

(51) Int. Cl.
G06F 1/32   (2006.01)

(52) U.S. Cl. .............. 713/323; 713/320; 713/322; 713/324

(58) Field of Classification Search .......... 713/300, 713/320, 322, 323, 324, 600
See application file for complete search history.

(56) References Cited

U.S. PATENT DOCUMENTS

| | | | | |
|---|---|---|---|---|
| 5,341,131 A | * | 8/1994 | Hoshino et al. | 340/825.21 |
| 5,440,747 A | * | 8/1995 | Kiuchi | 710/267 |
| 5,512,888 A | * | 4/1996 | Hoshino et al. | 340/825.65 |
| 5,841,996 A | * | 11/1998 | Nolan et al. | 710/305 |
| 6,557,063 B1 | * | 4/2003 | Wang et al. | 710/110 |
| 2007/0125853 A1 | * | 6/2007 | Liu | 235/439 |

FOREIGN PATENT DOCUMENTS

JP   2001-174534   6/2001

OTHER PUBLICATIONS

English Abstract of Japan Publication No. 2001-174534 Published Jun. 29, 2001.

* cited by examiner

*Primary Examiner*—Dennis M Butler
(74) *Attorney, Agent, or Firm*—Ladas and Parry LLP

(57) ABSTRACT

A disclosed communication device performs bidirectional serial communication by using a clock line and a data line. The communication device includes a starting condition detecting unit configured to detect a communication starting condition based on levels of the clock line and the data line and generate, in response to detecting the communication starting condition, a wake up signal for waking up another circuit in the communication device from a standby status; a clock sending/receiving unit connected to the clock line and configured to send/receive a clock signal; and an output control unit configured to fix the clock line at a predetermined level by using the clock sending/receiving unit so as to suspend the bidirectional serial communication after the wake up signal is received from the starting condition detecting unit and until a standby status cancel instruction indicating that the other circuit has woken up from the standby status is received from the other circuit. The bidirectional serial communication is performed with another communication device via the clock line and the data line after the other circuit has woken up.

8 Claims, 8 Drawing Sheets

COMMUNICATION DEVICE, SEMICONDUCTOR INTEGRATED CIRCUIT DEVICE, AND COMMUNICATION SYSTEM

BACKGROUND OF THE INVENTION

1. Field of the Invention

The present invention relates generally to communication devices, semiconductor integrated circuit devices, and communication systems, and more particularly to a communication device, a semiconductor integrated circuit device, and a communication system for performing bidirectional serial communication by using a clock line and a data line.

2. Description of the Related Art

In recent years and continuing, battery packs of portable personal computers or digital cameras are provided with fuel gauges for measuring the residual battery energy quantity. A fuel gauge IC is an IC chip that calculates the residual battery energy quantity by integrating the charge and discharge currents of the battery, and reports the calculated residual battery energy quantity to a main unit circuit of a main unit of the portable personal computer or the digital camera (Patent Document 1).

The fuel gauge IC itself consumes power. Thus, in order to make the battery last longer, a low-power consuming fuel gauge IC is desired. Communication with the fuel gauge IC is performed with an I2C (Inter-Integrated Circuit, I square C) communication method. An I2C controller is installed in the fuel gauge, and the I2C controller communicates with the main unit circuit.

FIG. 8 illustrates an example of an operation performed in the conventional I2C communication method. Operation timings of data signals SDA are illustrated in (A), and operation timings of clock signals SCL are illustrated in (B).

In response to detecting starting conditions (for starting communication) at a time t1, the I2C controller sequentially outputs clock signals SCL at substantially fixed intervals as shown in (B). Based on the clock signals SCL shown in (B), data signals SDA are communicated between another device as shown in (A).

If the I2C controller comes to a standby status, it takes time for the I2C controller to wake up from the standby status. Accordingly, it takes time to start communications and responses to another device are thus delayed, such that communications with another device cannot be properly performed. To prevent such a circumstance, the I2C controller is constantly operated to be constantly ready for returning responses to another device.

Patent Document 1: Japanese Laid-Open Patent Application No. 2001-174534

In this type of conventional communication system, the communication controller (e.g., I2C controller) is constantly operated to be ready for immediately responding to another device when starting conditions are satisfied. Thus, power consumption of the communication controller cannot be reduced.

SUMMARY OF THE INVENTION

The present invention provides a communication device, a semiconductor integrated circuit device, and a communication system in which one or more of the above-described disadvantages are eliminated.

A preferred embodiment of the present invention provides a communication device, a semiconductor integrated circuit device, and a communication system in which power consumption can be reduced.

An embodiment of the present invention provides a communication device for performing bidirectional serial communication by using a clock line and a data line, the communication device including a starting condition detecting unit configured to detect a communication starting condition based on levels of the clock line and the data line and generate, in response to detecting the communication starting condition, a wake up signal for waking up another circuit in the communication device from a standby status; a clock sending/receiving unit connected to the clock line and configured to send/receive a clock signal; and an output control unit configured to fix the clock line at a predetermined level by using the clock sending/receiving unit so as to suspend the bidirectional serial communication after the wake up signal is received from the starting condition detecting unit and until a standby status cancel instruction indicating that the other circuit has woken up from the standby status is received from the other circuit; wherein the bidirectional serial communication is performed with another communication device via the clock line and the data line after the other circuit has woken up.

According to one embodiment of the present invention, a communication device, a semiconductor integrated circuit device, and a communication system are provided, in which communication is suspended until a standby status is cancelled and communication starts after communication is enabled so that only minimum circuits need to be operating during the standby status, thus reducing power consumption.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given, with reference to the accompanying drawings, of an embodiment of the present invention.

Figure 1:
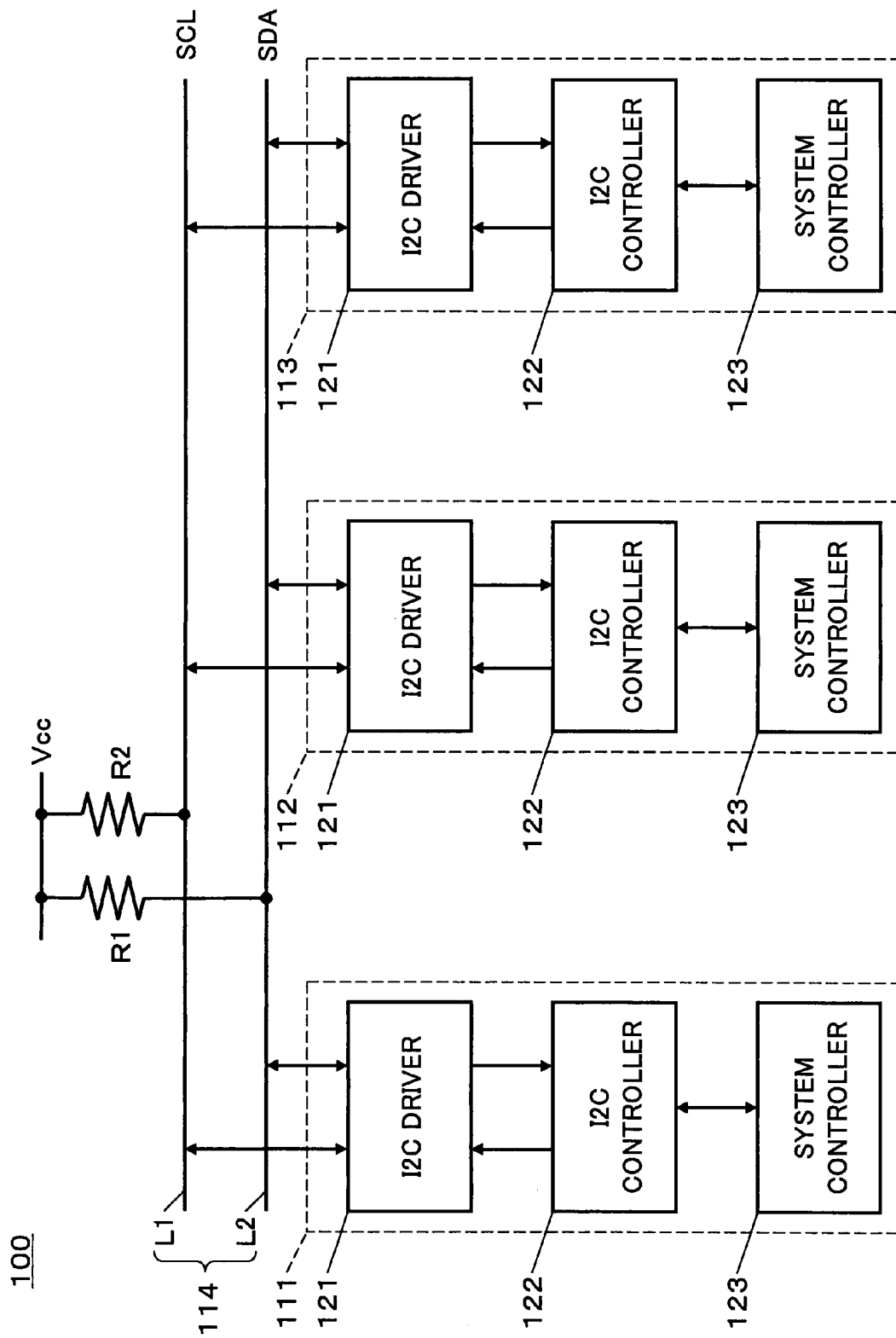
FIG. 1 is a block diagram of a communication system according to an embodiment of the present invention.

FIG. 1 is a block diagram of a communication system according to an embodiment of the present invention. As shown in FIG. 1, a communication system 100 includes communication devices 111, 112, 113 interconnected via communication lines 114. The communication lines 114 include a clock line L1 and a data line L2.

The clock line L1 receives a power supply voltage Vcc via a resistance R2. Accordingly, the clock line L1 is pulled up to a predetermined voltage. The data line L2 receives the power supply voltage Vcc via a resistance R1. Accordingly, the data line L2 is pulled up to a predetermined voltage.

Each of the communication devices 111-113 includes an I2C driver 121, an I2C controller 122, and a system controller 123. Each of the communication devices 111-113 is connected to the communication lines 114 via the I2C driver 121. The I2C driver 121 sends/receives clock signals SCL and data signals SDA via the communication lines 114 under the control of the I2C controller 122. The I2C controller 122 supplies received data to the system controller 123 and receives from the system controller 123 data to be sent out.

Figure 2:
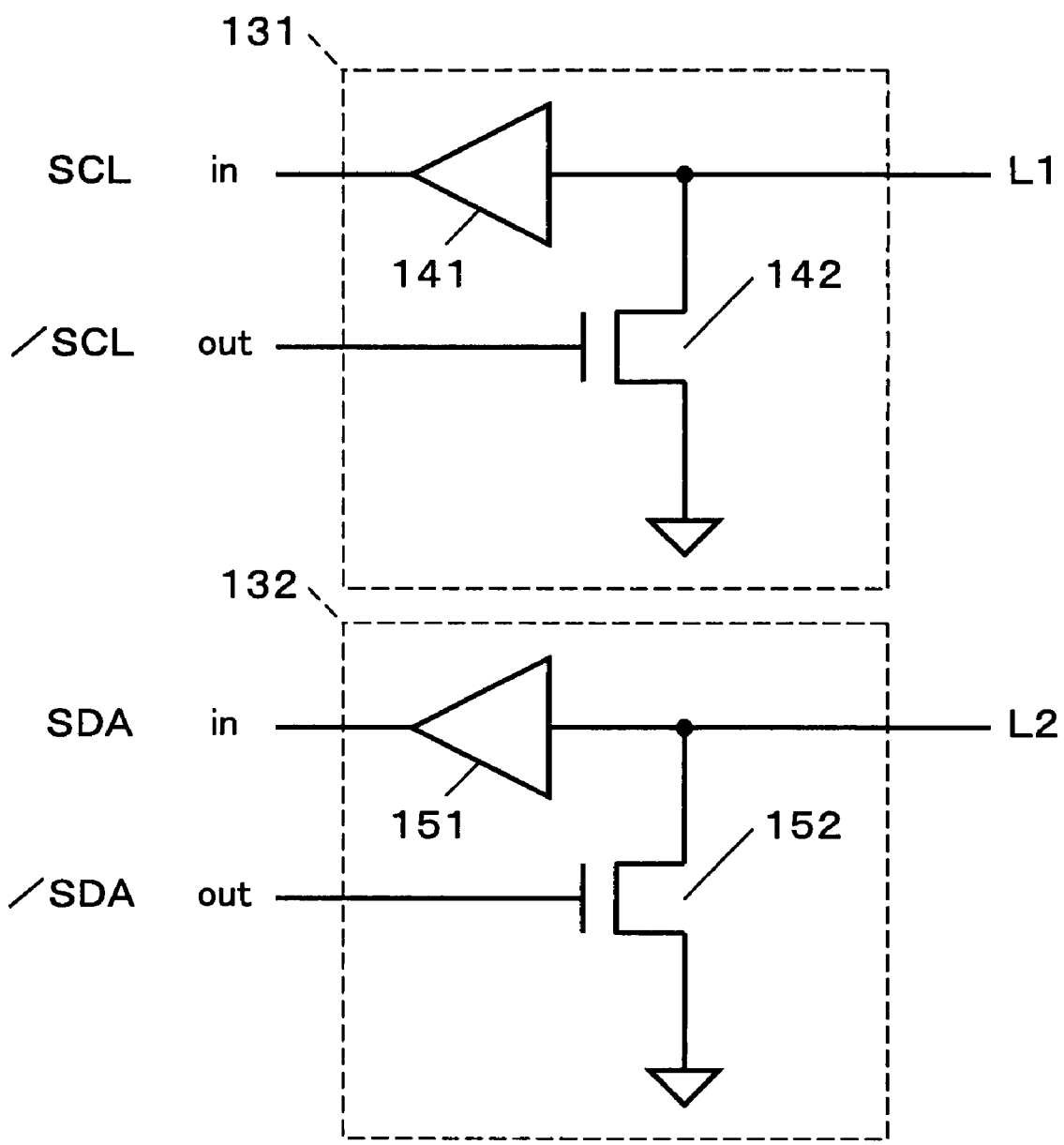
FIG. 2 is a block diagram of an I2C driver.

FIG. 2 is a block diagram of the I2C driver 121. As shown in FIG. 2, the I2C driver 121 includes a clock driver 131 and a data driver 132.

The clock driver 131 includes a driver circuit 141 and an n channel transistor 142. The driver circuit 141 receives the clock signals SCL from the clock line L1 of the communication lines 114 and supplies them to the I2C controller 122. The transistor 142 is connected between the clock line L1 of the communication lines 114 and ground, and turns on when the clock signal SCL received from the I2C controller 122 is high level and turns off when the clock signal SCL received from the I2C controller 122 is low level. Accordingly, the transistor 142 sends out the clock signals SCL to the clock line L1 by controlling the electric potential of the clock line L1 to be at a low level or at a high level.

The data driver 132 includes a driver circuit 151 and an n channel transistor 152. The driver circuit 151 receives the data signals SDA from the data line L2 of the communication lines 114 and supplies them to the I2C controller 122. The transistor 152 is connected between the data line L2 of the communication lines 114 and ground, and turns on when the data signal SDA received from the I2C controller 122 is high level and turns off when the data signal SDA received from the I2C controller 122 is low level. Accordingly, the transistor 152 sends out the data signals SDA to the data line L2 by controlling the electric potential of the data line L2 to be low level/high level.

Figure 3:
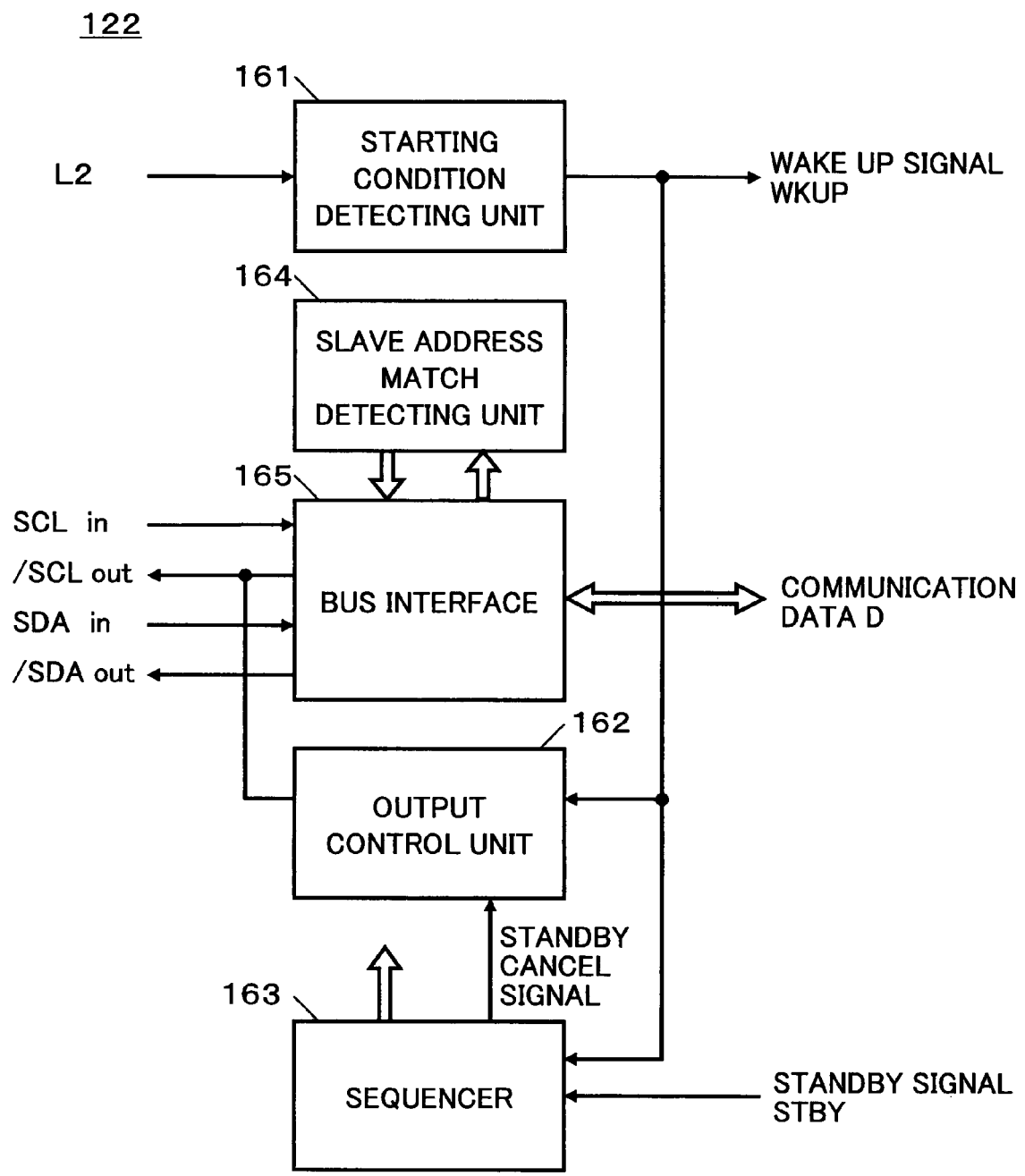
FIG. 3 is a functional block diagram of an I2C controller.

FIG. 3 is a functional block diagram of the I2C controller 122. As shown in FIG. 3, the I2C controller 122 includes a starting condition detecting unit 161, an output control unit 162, a sequencer 163, a slave address match detecting unit 164, and a bus interface 165. In a standby status, among these units, operating power is supplied only to the starting condition detecting unit 161 and the output control unit 162, and operating power is not supplied to the sequencer 163, the slave address match detecting unit 164, or the bus interface 165.

For example, the starting condition detecting unit 161 is connected to the clock line L1 and the data line L2, detects a communication starting condition according to the status of the clock line L1 and the data line L2, and outputs a wake up signal WKUP.

For example, when the clock line L1 is in a high-level status and the data line L2 is in a low-level status, the starting condition detecting unit 161 determines that another communication device has started transmission, i.e., a communication starting condition is detected, and causes the wake up signal WKUP to become high-level.

The basis for detecting a communication start condition is not limited to the clock line L1 and the data line L2; any other basis can be used as long as a condition for starting communication can be detected.

The wake up signal WKUP output from the starting condition detecting unit 161 is supplied to the system controller 123, the output control unit 162, and the sequencer 163.

The output control unit 162 receives the wake up signal WKUP from the starting condition detecting unit 161 and receives a standby cancel signal from the sequencer 163. When the wake up signal WKUP from the starting condition detecting unit 161 becomes high-level, i.e., when a communication start condition is satisfied, the output control unit 162 controls the clock signal SCL that controls the transistor 142 included in the clock driver 131 of the I2C driver 121 so that the transistor 142 is turned on. When the transistor 142 is turned on, the clock line L1 of the communication lines 114 is caused to be retained at a low level.

When the standby cancel signal is received from the sequencer 163 indicating that the standby status of the system controller 123 and the I2C controller 122 is cancelled, the output control unit 162 determines that preparation for communication has been completed, and controls the clock signal SCL that controls the transistor 142 included in the clock driver 131 of the I2C driver 121 so that the transistor 142 is turned off.

Accordingly, a clock signal sent from another communication device appears on the clock line L1 of the communication lines 114, so that clocks supplied via the clock line L1 and data supplied via the data line L2 can be received.

The sequencer 163 monitors and controls all units of the I2C controller 122. When the wake up signal WKUP received from the starting condition detecting unit 161 turns into a high-level signal, the sequencer 163 starts receiving operating power for the I2C controller 122 and executes a process for waking up the I2C controller 122 from a standby status, so that operating power is supplied to the slave address match detecting unit 164 and the bus interface 165. Subsequently, when a standby signal received from the system controller 123 becomes low level, the sequencer 163 supplies a standby cancel signal indicating that the standby status has been cancelled to the output control unit 162.

The slave address match detecting unit 164 receives data received from the other communication device via the bus interface 165 in parallel and compares a slave address that is the destination of the received data with the address of itself, i.e., the address of the communication device in which the I2C controller 122 is provided. When the slave address matches the address of itself, the slave address match detecting unit 164 supplies a match detection signal to the bus interface 165.

The bus interface 165 exchanges communication data with the system controller 123 in parallel, and exchanges clock signals SCL and data signals SDA with the I2C driver 121. In synchronization with clock signals SCL received from the clock line L1, the bus interface 165 shifts the data signals SDA received in series from the data line L2 with a built-in shift register. The bus interface 165 then supplies the received data shifted with the built-in shift register to the slave address match detecting unit 164 in parallel. When the match detection signal is received from the slave address match detecting unit 164, the bus interface 165 transfers, as communication data, the received data shifted with the built-in shift register to the system controller 123 in parallel.

Figure 4:
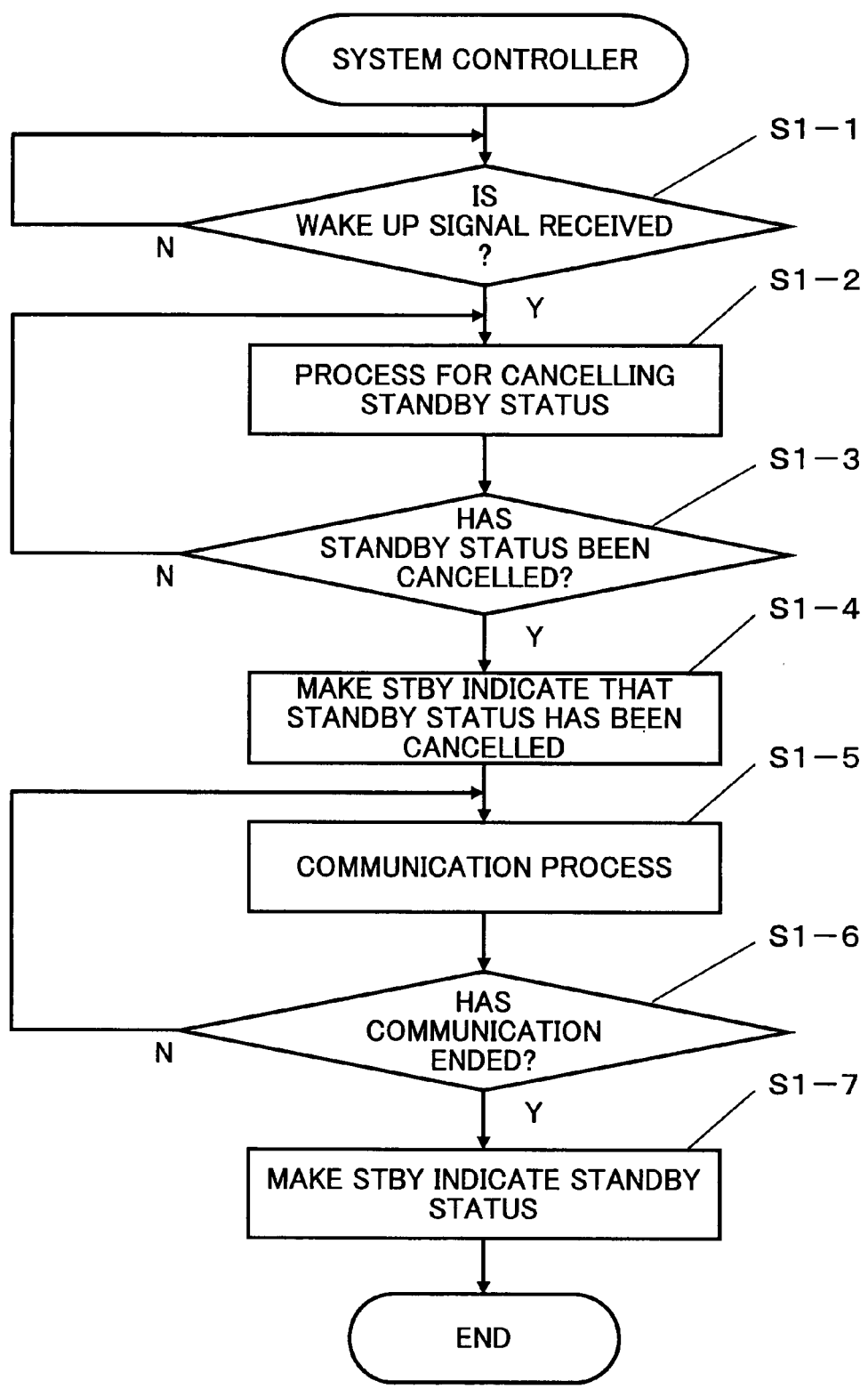
FIG. 4 is a flowchart of a process performed by a system controller.

Next, operations of the system controller 123 are described. FIG. 4 is a flowchart of a process performed by the system controller 123.

When the wake up signal WKUP is received from the starting condition detecting unit 161 of the I2C controller 122 at step S1-1, the system controller 123 performs a process for cancelling a standby status at step S1-2. The system controller 123 determines whether the standby status is cancelled at step S1-3. When the standby status is cancelled, at step S1-4, the system controller 123 makes a value of a standby signal STBY, which is to be supplied to the I2C controller 122, indicate that the standby status has been cancelled. For example, the standby signal STBY is made to be low-level.

Accordingly, the standby status of the I2C controller 122 is cancelled, communication is performed, i.e., data are received via the communication lines 114, and the received data are supplied to the I2C controller 122 at step S1-5.

Subsequently, at step S1-6, when it is determined that the communication has ended, i.e., data have been received, the system controller 123 makes the I2C controller 122 come to a standby status at step S1-7. Specifically, the system controller 123 makes the standby signal STBY supplied to the I2C controller 122 become high-level, which indicates a standby status.

When the standby signal STBY received from the system controller 123 is high-level, i.e., the system controller 123 comes to the standby status, the sequencer 163 in the I2C controller 122 stops operating power from being supplied to the sequencer 163, the slave address match detecting unit 164, and the bus interface 165, so as to come to a standby status.

<Operations>

Figure 5:
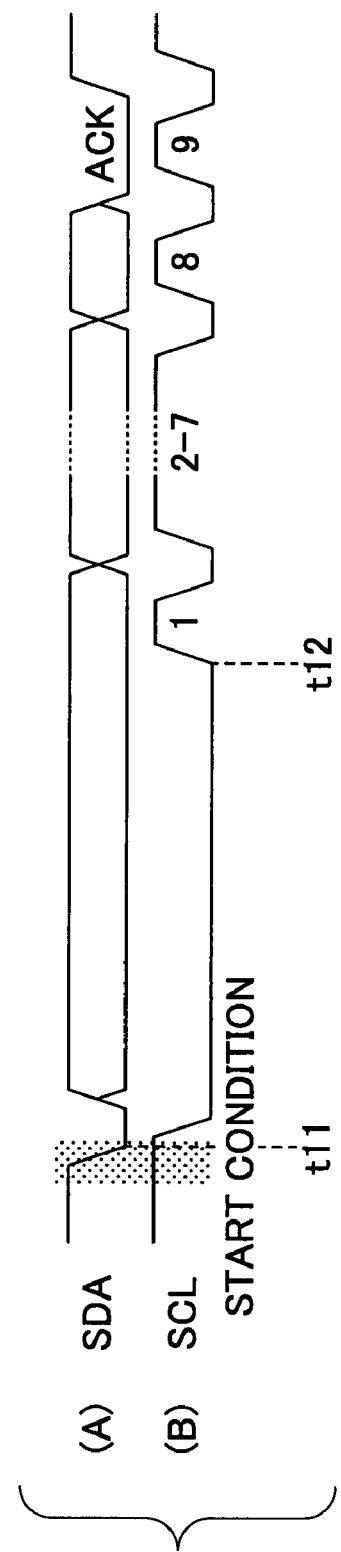
FIG. 5 illustrates an operation according to an embodiment of the present invention.

FIG. 5 illustrates an operation according to an embodiment of the present invention. In FIG. 5, statuses of data signals SDA in the data line L2 are illustrated in (A), and statuses of clock signals SCL in the clock line L1 are illustrated in (B).

When another communication device sends clock signals SCL to the clock line L1 and data signals SDA to the data line L2, the data line L2 becomes low-level while the clock line L1 is high-level at time t11. The starting condition detecting unit 161 of the I2C controller 122 detects this and determines that starting conditions are satisfied. Accordingly, the wake up signal WKUP becomes high-level. Then, the output control unit 162 causes the clock line L1 to be retained at a low level. Furthermore, as the wake up signal WKUP becomes high-level, a process starts for waking up the system controller 123 and the I2C controller 122 from the standby status so that communication can be performed.

As the clock line L1 is retained at a low level, the clock signals SCL output from the other communication device do not appear on the clock line L1. Therefore, the other communication device postpones sending data signals SDA to the data line L2.

At time t12, when the I2C controller 122 and the system controller 123 are capable of performing communication, the output control unit 162 turns off the transistor 142 in the clock driver 131 in the I2C driver 121, so that the clock line L1 is released from being retained at the low level, so that the clock signals SCL received from the other communication device appear on the clock line L1. The number of clock signals between the time t11 and the time t12 is around several ten-several hundred clocks.

When the other communication device detects that clock signals SCL output from itself have appeared on the clock line L1, the other communication device starts sending data signals SDA to the data line L2 along with the clock signals SCL being sent on the clock line L1. Accordingly, data communication via the data line L2 is enabled.

As described above, according to the present embodiment, when communication is not performed, the system controller 123, the sequencer 163, the slave address match detecting unit 164, and the bus interface 165 can be in a standby status, as long as the starting condition detecting unit 161 and the output control unit 162 of the I2C controller 122 are operating. Specifically, until the standby status of the system controller 123, the sequencer 163, the slave address match detecting unit 164, and the bus interface 165 is cancelled, the communication lines 114 are disabled so that another communication device needs to wait before starting communication. Therefore, the units other than the starting condition detecting unit 161 and the output control unit 162 in the I2C controller 122 and the system controller 123 can be in a standby status.

As a result, it is possible to reduce the power consumption of the I2C controller 122 and the system controller 123. Furthermore, the starting condition detecting unit 161 and the output control unit 162 can be realized with a relatively simple configuration, and can thus be applied easily.

Figure 6:
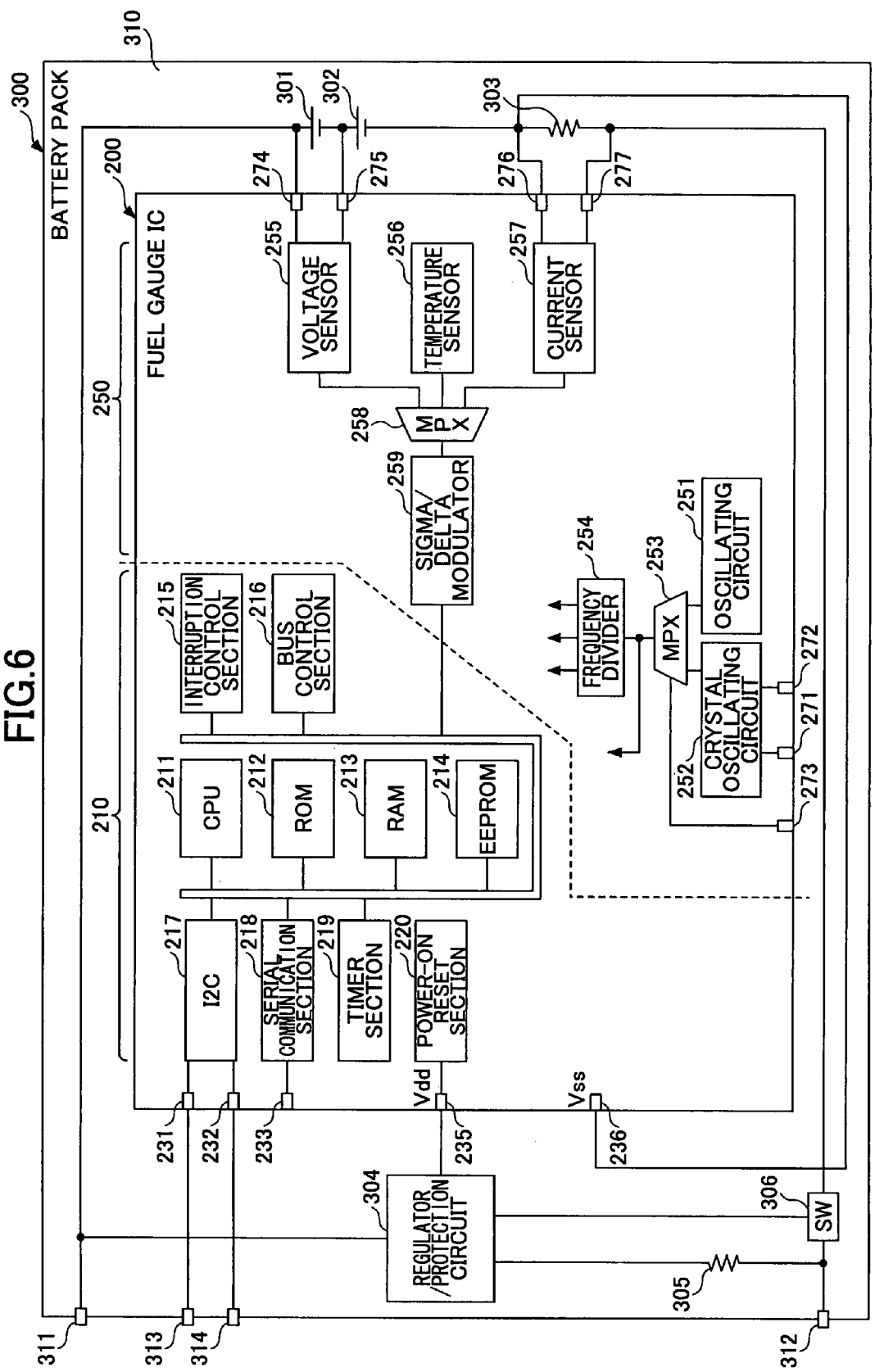
FIG. 6 is a block diagram of an embodiment of a battery pack to which the communication system according to an embodiment of the present invention is applied.

FIG. 6 is a block diagram of an embodiment of a battery pack to which the communication system according to an embodiment of the present invention is applied. A fuel gauge IC 200 is integrated on a semiconductor, and is primarily configured with a digital unit 210 and an analog unit 250.

The digital unit 210 includes a CPU 211, a ROM 212, a RAM 213, an EEPROM 214, an interruption control section 215, a bus control section 216, an I2C section 217, a serial communication section 218, a timer section 219, and a power-on reset section 220. These circuits are interconnected by an internal bus.

The CPU 211 executes a program stored in the ROM 212 to control the entire fuel gauge IC 200, and executes processes such as calculating the residual battery energy quantity by integrating the charge and discharge currents of the battery. The RAM 213 is used as a working area for these operations. The EEPROM 214 stores trimming information, etc. The CPU 211 corresponds to the system controller 123 shown in FIG. 1.

The interruption control section 215 receives interrupt requests from each of the sections of the fuel gauge IC 200, generates an interrupt according to priority levels of the interrupt requests, and sends the interrupt to the CPU 211. The bus control section 216 controls which circuit section uses the internal bus.

The I2C section 217 corresponds to the I2C driver 121 and the I2C controller 122 shown in FIG. 1, and is connected to communication lines via ports 231, 232 and performs two-wire system serial communication. The serial communication section 218 is connected to a communication line via a port 233 and performs one-wire system serial communication.

The timer section 219 counts the system clock, and the counted value is referred to by the CPU 211. The power-on reset section 220 detects that power Vdd is supplied to a port 235, generates a reset signal, and supplies the reset signal to each of the sections of the fuel gauge IC 200.

The analog unit 250 includes an oscillating circuit 251, a crystal oscillating circuit 252, a multiplexer (MPX) 253, a frequency divider 254, a voltage sensor 255, a temperature sensor 256, a current sensor 257, a multiplexer 258, and a sigma/delta modulator 259.

The oscillating circuit 251 is an oscillator with a PLL and outputs oscillating signals of several MHz. The crystal oscillating circuit 252 performs oscillation with crystal transducers externally attached to ports 271, 272 and outputs oscillating signals of several MHz. The oscillating wavelength of the crystal oscillating circuit 252 is highly precise with respect to the oscillating circuit 251.

The multiplexer 253 selects oscillating frequency signals output from either one of the oscillating circuit 251 or the crystal oscillating circuit 252 based on selection signals received from a port 273, and supplies them as system clocks to each of the sections of the fuel gauge IC 200 as well as to the frequency divider 254. When selection signals are not received from the port 273, the multiplexer 253 selects, for example, oscillating frequency signals output from the oscillating circuit 251. The frequency divider 254 divides the frequency clock to generate various clocks, and supplies them to each of the sections of the fuel gauge IC 200.

The voltage sensor 255 detects the voltages of batteries 301, 302 externally attached to ports 274, 275, respectively, and supplies detected analog voltage levels to the multiplexer 258. The temperature sensor 256 detects the environmental temperature of the fuel gauge IC 200, and supplies the detected analog temperature level to the multiplexer 258.

Both ends of a resistance 303 used for current detection are connected to corresponding ports 276, 277. The current sensor 257 detects the current level flowing through the resistance 303 based on a electric potential drop across the ports 276, 277, and supplies the detected analog current level to the multiplexer 258.

The multiplexer 258 sequentially selects the detected analog voltage level, the detected analog temperature level, and the detected analog current level, and supplies them to the sigma/delta modulator 259. The sigma/delta modulator 259 performs sigma/delta conversion on each of the detected values to supply pulse density modulation signals to the CPU 211 via the internal bus. The CPU 211 performs a digital filter process to digitize the detected voltage, the detected temperature, and the detected current. Furthermore, the CPU 211 calculates the residual battery energy quantity by integrating the charge and discharge currents of the battery. The detected temperature is used for correcting the temperature.

The fuel gauge IC 200 is housed inside a chassis 310 together with the batteries (lithium ion batteries) 301, 302, the resistance 303 used for current detection, a regulator/protection circuit 304, a resistance 305, and a switch 306, thereby configuring a battery pack 300. A terminal 311 of the battery pack 300 is connected to a positive electrode of the battery 301 and a power supply input terminal of the regulator/protection circuit 304, and the power supply input terminal of the regulator/protection circuit 304 is connected to the port 235 of the power supply Vdd of the fuel gauge IC 200. A terminal 312 is connected to a ground terminal-of the regulator/protection circuit 304 via the resistance 305, and is connected to the connection point of the resistance 303 used for current detection and the port 277 via the switch 306. The regulator/protection circuit 304 stabilizes the voltage between the terminals 311 and 312, and when this voltage deviates from a predetermined range, the regulator/protection circuit 304 performs a protecting operation by shutting down the switch 306.

The connection point of the resistance 303 used for current detection and the port 276 is connected to a port 236 of a power supply Vss of the fuel gauge IC 200. Terminals 313, 314 of the battery pack 300 are connected to the ports 231, 232, respectively, of the fuel gauge IC 200.

Figure 7:
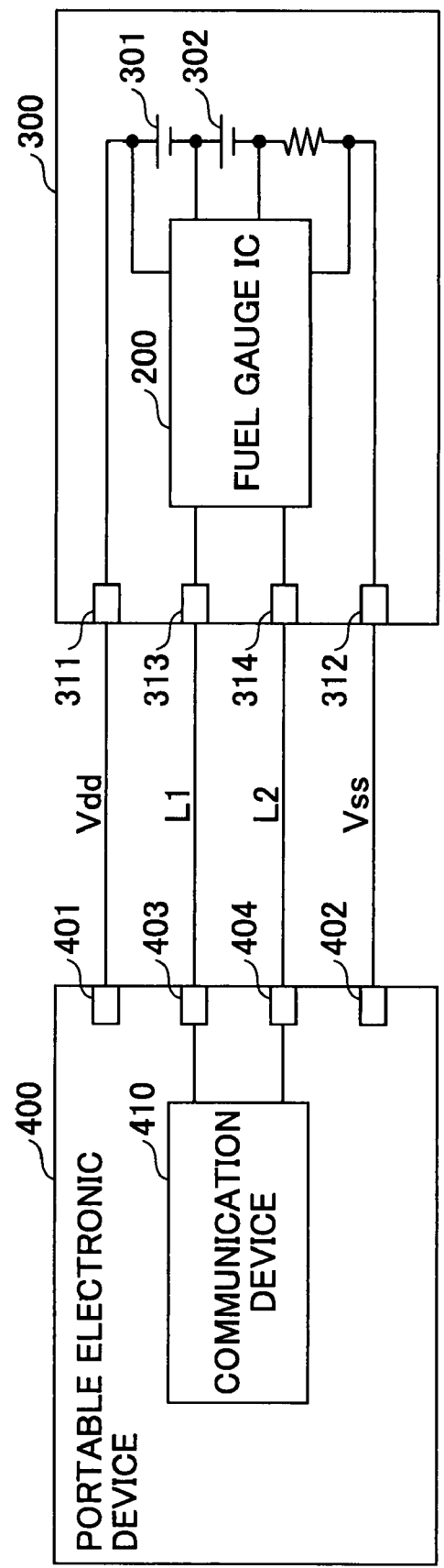
FIG. 7 is a block diagram of an embodiment of a portable electronic device employing the battery pack shown in FIG. 6.
Figure 8:
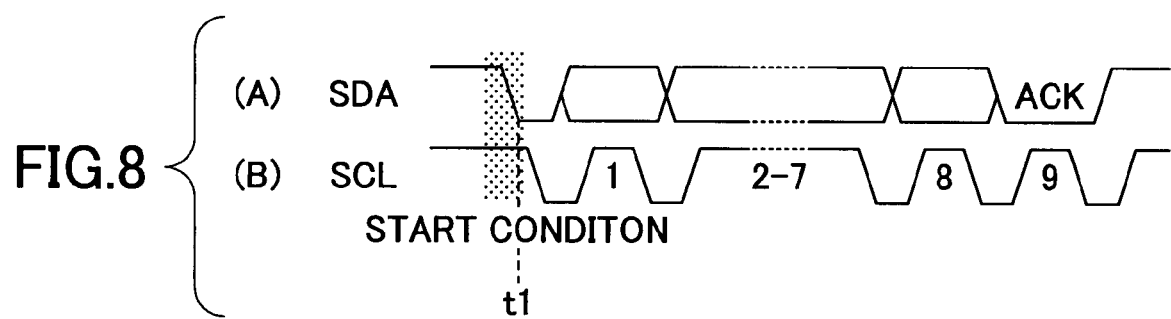
FIG. 8 illustrates an example of an operation performed in a conventional I2C communication method.

FIG. 7 is a block diagram of an embodiment of a portable electronic device employing the battery pack shown in FIG. 6. A portable electronic device 400 shown in FIG. 7 is, for example, a portable personal computer, a digital still camera, or a mobile phone. A main circuit unit of the portable electronic device 400 is shown in FIG. 7. The portable electronic device 400 includes a communication device 410 having the same configuration as that of the communication devices 111, 112, 113 shown in FIG. 1.

The terminals 311-314 of the battery pack 300 are respectively connected to terminals 401, 402 of power supplies Vdd, Vss and terminals 403, 404 connected to a clock line L1 and a data line L2 of the portable electronic device 400. Accordingly, power is supplied from the batteries 301, 302 in the battery pack 300 to the portable electronic device 400.

Under regular circumstances, the portable electronic device 400 operates as the master and the fuel gauge IC 200 operates as the slave. In response to a request received from the portable electronic device 400, the fuel gauge IC 200 reports a calculated residual battery energy quantity to the communication device 410 of the portable electronic device 400.

In the present embodiment, the I2C driver 121 and the I2C controller 122 are shown as separate blocks, but they can be integrated as a single section. In the present embodiment, the communication lines employ an I2C communication method; however, the communication method is not limited to the I2C communication method. The present invention is applicable to general communication methods in which communication lines are enabled upon detecting predetermined starting conditions.

The present invention is not limited to the specifically disclosed embodiment, and variations and modifications may be made without departing from the scope of the present invention.

The present application is based on Japanese Priority Patent Application No. 2006-068100, filed on Mar. 13, 2006, and Japanese Priority Patent Application No. 2007-011480, filed on Jan. 22, 2007, the entire contents of which are hereby incorporated by reference.

What is claimed is:

1. A communication device for performing bidirectional serial communication by using a clock line and a data line, the communication device comprising:

a starting condition detecting unit configured to detect a communication starting condition based on levels of the clock line and the data line and generate, in response to detecting the communication starting condition, a wake up signal for waking up another circuit in the communication device from a standby status;

a clock sending/receiving unit connected to the clock line and configured to send/receive a clock signal; and an output control unit configured to fix the clock line at a predetermined level by using the clock sending/receiving unit so as to suspend the bidirectional serial communication after the wake up signal is received from the starting condition detecting unit and until a standby status cancel instruction indicating that the other circuit has woken up from the standby status is received from the other circuit; wherein the bidirectional serial communication is performed with another communication device via the clock line and the data line after the other circuit has woken up.

2. The communication device according to claim 1, further comprising:

an interface unit configured to convert a data signal received in series from the data line into parallel data by using the clock signal received from the clock line; and an address match detecting unit configured to compare a destination address of the parallel data received from the interface unit with an address of the communication device and supply the parallel data to the other circuit if the destination address and the address match; wherein the interface unit and the address match detecting unit enter the standby status together with the other circuit and wake up according to the wake up signal.

3. The communication device according to claim 1, wherein the starting condition detecting unit detects the communication starting condition when the clock line is in a high-level status and the data line is in a low-level status.

4. The communication device according to claim 1, wherein the other circuit enters the standby status when the bidirectional serial communication with the other communication device ends.

5. A semiconductor integrated circuit device, wherein the communication device according to claim 1 is integrated in a semiconductor circuit.

6. The semiconductor integrated circuit device according to claim 5, wherein
the other circuit calculates a residual battery energy quantity by integrating a charge current and a discharge current of a battery.

7. A battery pack in which the semiconductor integrated circuit device according to claim 6 is installed together with the battery, wherein
power is supplied from the battery to an electronic device, and
battery residual information is sent from the semiconductor integrated circuit device to the electronic device.

8. A communication system in which three or more of the communication devices according to claim 1 are connected to the clock line and the data line.

* * * * *